US 6,640,946 B2

(12) United States Patent
Bauer et al.

(10) Patent No.: US 6,640,946 B2
(45) Date of Patent: Nov. 4, 2003

(54) HYDRODYNAMIC CLUTCH ARRANGEMENT

(75) Inventors: Thomas Bauer, Grossbardorf (DE); Peter Frey, Gerolzhofen (DE); Ruthard Knoblach, Bergrheinfeld (DE); Christoph Sasse, Schweinfurt (DE)

(73) Assignee: Mannesmann Sachs AG, Schweinfurt (DE)

( * ) Notice: Subject to any disclaimer, the term of this patent is extended or adjusted under 35 U.S.C. 154(b) by 0 days.

(21) Appl. No.: 10/073,784

(22) Filed: Feb. 11, 2002

(65) Prior Publication Data

US 2002/0117370 A1 Aug. 29, 2002

(30) Foreign Application Priority Data

Feb. 28, 2001 (DE) .......................................... 101 09 494

(51) Int. Cl.[7] .............................................. F16H 45/02
(52) U.S. Cl. ................. 192/3.29; 192/70.12; 192/70.14; 192/113.34
(58) Field of Search ............................ 192/3.28, 3.29, 192/3.3, 70.12, 70.14, 113.21, 113.34

(56) References Cited

U.S. PATENT DOCUMENTS

| RE16,014 E | * | 3/1925 | Wemp ...................... 192/70.12 |
| 5,211,270 A | | 5/1993 | Tamura et al. .............. 192/3.29 |
| 6,193,037 B1 | * | 2/2001 | Middelmann et al. ..... 192/3.29 |
| 6,264,018 B1 | * | 7/2001 | Matsuoka et al. ......... 192/3.29 |
| 6,293,380 B1 | | 9/2001 | Arhab ....................... 192/3.29 |
| 2002/0117369 A1 | * | 8/2002 | Bauer et al. ............... 192/3.29 |

FOREIGN PATENT DOCUMENTS

DE 198 26 351 12/1999

* cited by examiner

Primary Examiner—Richard M. Lorence
(74) Attorney, Agent, or Firm—Cohen, Pontani, Lieberman & Pavane

(57) ABSTRACT

A hydrodynamic clutch arrangement, particularly a torque converter or fluid coupling, includes a housing arrangement, a turbine wheel provided in the housing arrangement, a lockup clutch arrangement by which a torque transmitting connection can be produced selectively between the turbine wheel and the housing arrangement. The lockup clutch arrangement includes at least two friction members which are rotatable with a one of the housing arrangement and turbine wheel, at least one counter-friction member which is interposed between two friction members and is rotatable with the other of the housing arrangement and turbine wheel and can be brought into contact with friction surface regions of the friction members in friction surface regions of the counter-friction member. The counter-friction member has a substantially ring-shaped counter-friction member body having an outer radius ($R_a$) in a ratio of 1.1:1 to 1.5:1 to an outer radius ($r_a$) of the friction surface region or regions provided on the friction members and/or an inner radius ($R_i$) in a ratio of 0.4:1 to 0.8:1 to an inner radius ($r_i$) of the friction surface region or regions provided on the friction members.

7 Claims, 5 Drawing Sheets

HYDRODYNAMIC CLUTCH ARRANGEMENT

BACKGROUND OF THE INVENTION

1. Field of the Invention

The present invention is directed to a hydrodynamic clutch arrangement, particularly a torque converter or fluid coupling, including a housing arrangement, a turbine wheel provided in the housing arrangement, and a lockup clutch arrangement by which a torque transmitting connection can be produced selectively between the turbine wheel and the housing arrangement. The lockup clutch arrangement includes at least two friction members which are rotatable with one of the housing arrangement and turbine wheel, at least one counter-friction member which is rotatable with the other of the housing arrangement and turbine wheel and which is interposed between two friction members and can be brought into contact with friction surface regions of the friction members in friction surface regions of the counter-friction member.

2. Description of the Related Art

U.S. Pat. No. 6,293,380 discloses a hydrodynamic clutch arrangement in the form of a hydrodynamic torque converter. In this hydrodynamic torque converter, two friction members in the form of plates similar to friction disks are coupled with the turbine wheel for common rotation. These two plates lie between a clutch piston and an area of the housing arrangement. Friction surfaces with which corresponding friction surfaces at the two plates can be brought into contact are provided at the clutch piston and also at this area of the housing arrangement. Further, as an additional counter-friction member coupled with the housing arrangement for common rotation, a friction plate constructed in the manner of a ring disk is provided between the two friction members which are constructed as plates. This friction plate is pressed between the two plate-like friction members when the clutch piston is displaced. Friction facings are provided at the two friction members or plates at both sides, so that these friction facings can enter into frictional contact with the clutch piston or housing arrangement on the one hand and with the counter-friction member constructed as a ring disk on the other hand. Ultimately, this means that, in the area the friction members, the friction surface regions provided in this area are formed by surface regions of the friction facings, while in the area of the counter-friction members, i.e., the clutch piston, the structural component part which is constructed in the manner of a ring disk and located between the two friction members, and the housing arrangement, metal surfaces form the friction surface regions.

The basic problem in a hydrodynamic clutch arrangement constructed in this way is in that a comparatively large thermal load occurs in case of friction heat occurring in slip operation of the lockup clutch arrangement, particularly in the counter-friction element which is constructed in the manner of a ring disk and is located between the two plate-like friction elements. This is due to the fact that, first, this friction acts upon this structural component part over a large portion of its surface, so that there is only poor conduction of heat away from this structural component part. Also, its dimensions, particularly its thickness, are appreciably smaller, for example, than the clutch piston or housing arrangement in the area acted upon by friction, so that heat distribution in a larger volume area is also not possible in this case. Due to the nonuniform heating of the components or component areas in question during friction operation, local overheating can occur, so that damage to or failure of the entire lockup clutch arrangement can be caused in this overheated area in spite of the fact that other areas are not thermally overloaded.

U.S. Pat. No. 5,211,270 discloses a hydrodynamic clutch arrangement with a lockup clutch arrangement in which a counter-friction element which is constructed in the manner of a ring disk is connected with the housing arrangement so as to be rotatable. This counter-friction element constructed as a ring disk is located between a friction element which is constructed in the manner of a plate and a clutch piston which, in this case, is to be considered as an additional friction element which is rotatable in common with the plate-like friction element. In this arrangement also, the above-mentioned problem of local overheating due to comparatively poor capacity to dissipate heat can arise in the counter-friction element which is constructed as a ring disk and which is not provided with friction facings.

DE 198 26 351 discloses a hydrodynamic clutch arrangement in the form of a hydrodynamic torque converter in which the clutch piston as well as an abutment element are connected with the housing arrangement so as to be rotatable. Two plate-shaped friction members which have friction facings and are coupled with the turbine wheel for common rotation are located between these two elements. A counter-friction member which is constructed as a ring disk is located between these two friction members and, together with the abutment element and the clutch piston and another counter-friction member which is constructed as a ring disk and directly adjoins the clutch piston, is rotatable with the housing arrangement. In this arrangement, particularly in the region of the counter-friction member which is constructed as a ring disk and is interposed between the two friction members, there is a risk of local overheating due to the comparatively poor heat dissipation from this region.

SUMMARY OF THE INVENTION

It is the object of the present invention to further develop a hydrodynamic clutch arrangement of the type described above in such a way that the risk of local overheating due to heat generated in the region of the lockup clutch arrangement can be reduced or eliminated.

According to the invention, an outer radius of the counter-friction member body is in a ratio of 1.1:1 to 1.5:1 to an outer radius of the friction surface region or regions provided at the latter and/or an inner radius of the counter-friction member body is in a ratio of 0.4:1 to 0.8:1 to an inner radius of the friction surface region or regions provided at the latter.

By providing a counter-friction member having comparatively large surface regions which go beyond its friction surface region or regions and which are not acted upon by friction, wherein fluid present in a hydrodynamic clutch arrangement of this type flows around these large surface regions, friction heat that may be generated can be carried away from the counter-friction member in an improved manner so that the risk of local overheating can be prevented.

Further, in the hydrodynamic clutch arrangement according to the invention, a toothed rotational coupling formation which is in a rotational driving engagement with a rotational coupling formation provided at the housing arrangement is preferably provided at the radial inner area of the counter-friction member body. In this case, the at least two friction members are coupled with the turbine wheel so as to be rotatable.

In order to be able to generate the desired forces when frictional interaction is produced, it can further be provided that friction facings are provided at the at least two friction members and can be brought into contact at the friction surface regions of the counter-friction member.

According to another feature of the present invention, the above-stated object is met by a hydrodynamic clutch arrangement, particularly a torque converter or fluid coupling, comprising a housing arrangement, a turbine wheel provided in the housing arrangement, and a lockup clutch arrangement by which a torque transmitting connection can be produced selectively between the turbine wheel and the housing arrangement. The lockup clutch arrangement comprises at least two friction members which are rotatable with a subassembly comprising one of the housing arrangement and turbine wheel, at least one counter-friction member which is rotatable with the other subassembly comprising the other of the housing arrangement and turbine wheel and which is interposed between two friction members. The counter-friction member can be brought into contact with friction surface regions of the friction members in friction surface regions of the counter-friction member, by means of a pressing element.

According to the invention, it is further provided that the counter-friction member has, at least partially, a thickness that is at least as great as the thickness of the pressing element in its region acting upon the friction members and counter-friction members and/or that the counter-friction member has, at least partially, a thickness that is at least as great as the thickness of an abutment member, wherein the friction members and counter-friction members can be pressed between the abutment member and the pressing element.

Also, by providing a comparatively thick counter-friction member whose thickness corresponds at least to the thickness of other subassemblies involving friction, it can likewise be ensured that the heat energy generated in the region of the counter-friction member is distributed in a comparatively large volume area and is accordingly conducted off comparatively quickly from the surface regions and can be carried off into the surroundings in an improved manner.

It is noted that, of course, this feature can be combined with the preceding feature relating to the dimensioning of the radial extension of the counter-friction member.

In a hydrodynamic clutch arrangement constructed in the manner described above, the friction members can preferably be rotatable with the turbine wheel and the counter-friction member can be rotatable with the housing arrangement.

An embodiment form which is very simple to construct can be achieved when the housing arrangement forms the abutment member.

The present invention will be described more fully in the following with reference to the accompanying drawings.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1:
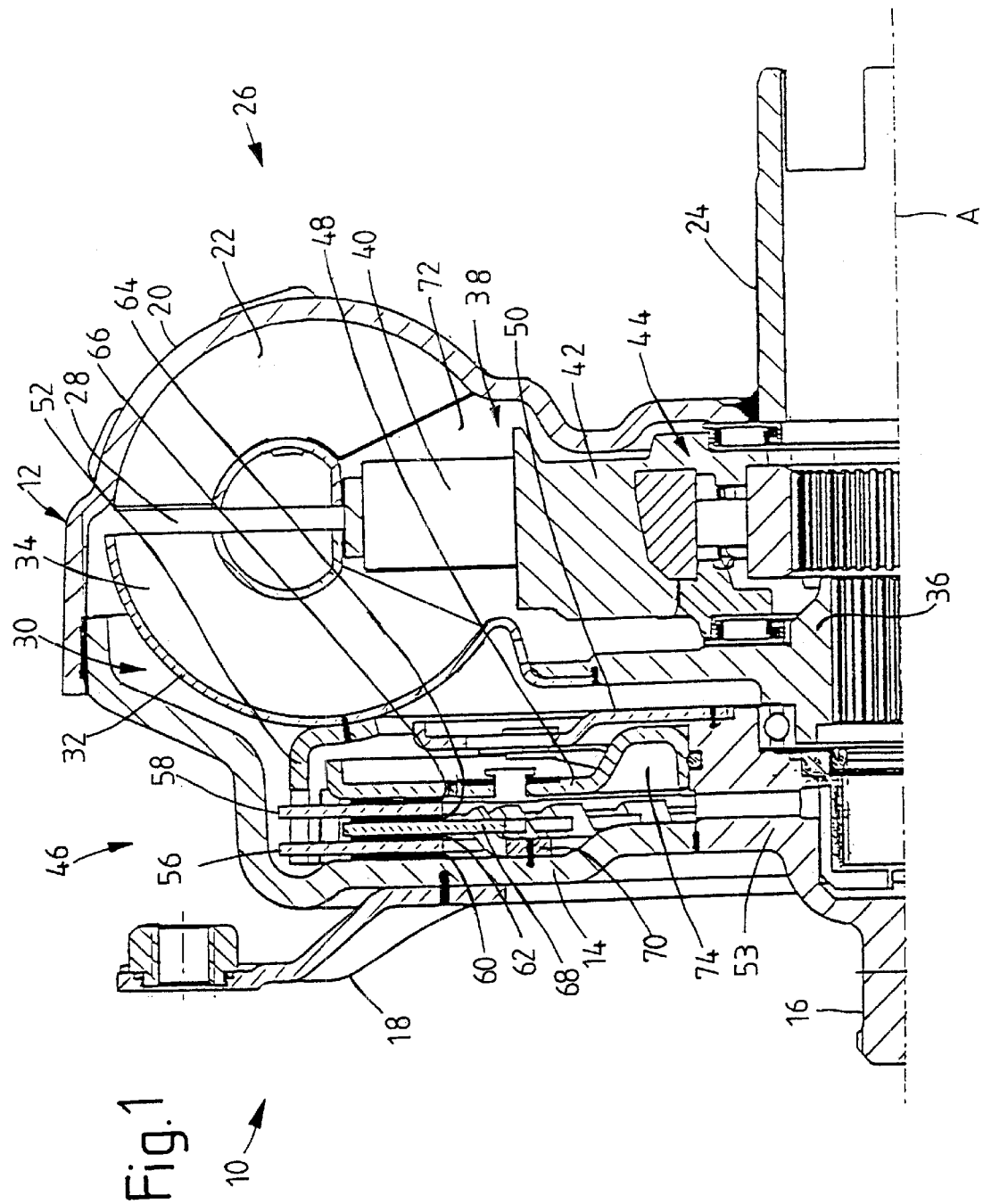
FIG. 1 shows a partial longitudinal section through a hydrodynamic clutch arrangement in the form of a hydrodynamic torque converter.

Before the steps according to the invention are examined in detail, the construction of a hydrodynamic clutch arrangement of the type mentioned in the beginning will be described in general with reference to FIG. 1.

The hydrodynamic clutch arrangement which is in the form of a hydrodynamic torque converter 10 comprises a housing arrangement 12. The housing arrangement 12 in turn comprises a housing cover 14 which is connected in its central region with a housing hub 53 carrying a bearing pin 16 and which can be connected via a coupling arrangement 18 to a drive shaft, for example, a crankshaft of a combustion engine. An impeller wheel shell 20 is fixedly connected in a radial outer area with this housing cover 14, e.g., by welding. The impeller wheel shell 20 is curved out in its radial outer region and in this region carries a plurality of impeller wheel blades 22. The impeller wheel shell 20 is fixedly connected in its radial inner region to an impeller wheel hub 24 which is arranged concentric to an axis of rotation A. The impeller wheel shell 20, together with the impeller wheel hub 24 and impeller wheel blades 22, essentially forms an impeller wheel.

A turbine wheel 30 is arranged in the interior 28 of the housing arrangement 12. This turbine wheel 30 comprises a turbine wheel shell 32 which carries a plurality of turbine wheel blades 34 in its radial outer, curved region. In the inner area, the turbine wheel shell 32 is connected with a turbine wheel hub 36. A driving member, not shown, for example, a transmission input shaft, can be driven in rotation by the torque converter 10 according to the invention via the turbine wheel hub 36.

A stator wheel 38 is located between the impeller wheel 26 and the turbine wheel 30. This stator wheel 38 comprises a plurality of stator wheel blades 40 which are arranged on a stator wheel ring 42. The stator wheel ring 42 is supported, via a freewheel arrangement, 44, on a supporting element, not shown, which is concentric to the impeller wheel hub 24 and to the driven shaft, also not shown, and is arranged between these two component elements, the stator wheel ring 42 being supported in such a way that it is rotatable in one direction about the axis of rotation A but is prevented from rotating in the other direction.

Further, the torque converter 10 has a lockup clutch arrangement 46. This comprises a clutch piston 48 which is supported at the housing hub 53 so as to be fixed with respect to rotation but axially movable relative to it. A driver ring 52 is arranged at the turbine wheel shell 32 so as to be fixed with respect to rotation relative to it. Two essentially ring-shaped plates are connected as friction members 56, 58 to this driver ring 52 so as to be fixed with respect to rotation relative to it via corresponding teeth. Each of these plates carries two friction facings 60, 62, 64, 66. The friction facing 60 of the plate 56 located nearest to the housing cover 14 can be brought into frictional contact with an inner surface region of the housing cover 14 located opposite to it, and the friction facing 66 of the plate 58 located nearest to the clutch piston 48 can be brought into frictional contact with a corresponding friction surface region of the clutch piston 48. A counter-friction member 68 which is constructed essentially as a ring disk is located between these two friction members 56, 58 which are constructed as plates and are rotatable with the turbine wheel 30. This counter-friction member 68 is coupled via another toothed driver ring 70 to the housing arrangement 12 and housing cover 14 so as to be fixed with respect to rotation relative to the latter and can be brought into contact with these friction facings 62, 64 in its radial outer region in the friction surface regions located opposite the friction facings 62, 64.

By increasing the fluid pressure in the spatial region 72 formed between the clutch piston 48 and the impeller wheel shell 20 in relation to the fluid pressure provided in the spatial region formed essentially between the clutch piston 48 and housing cover 14, the clutch piston 48 is pressed in the direction of the housing cover 14. Frictional interaction takes place between the oppositely located friction surface regions of the clutch piston 48, plates 56, 58 and friction facings 60, 62, 64, 66 of the same, the counter-friction disk which essentially forms the counter-friction member 68, and the housing cover 14, so that torque can be transmitted from the housing cover 14 and housing arrangement 12 to the turbine wheel 30 by means of the lockup clutch arrangement 46.

It should be noted that the basic construction of a hydrodynamic clutch arrangement has been described above only to the extent necessary for understanding the present invention. Of course, other constructions can be provided in widely different areas.

Figure 2:
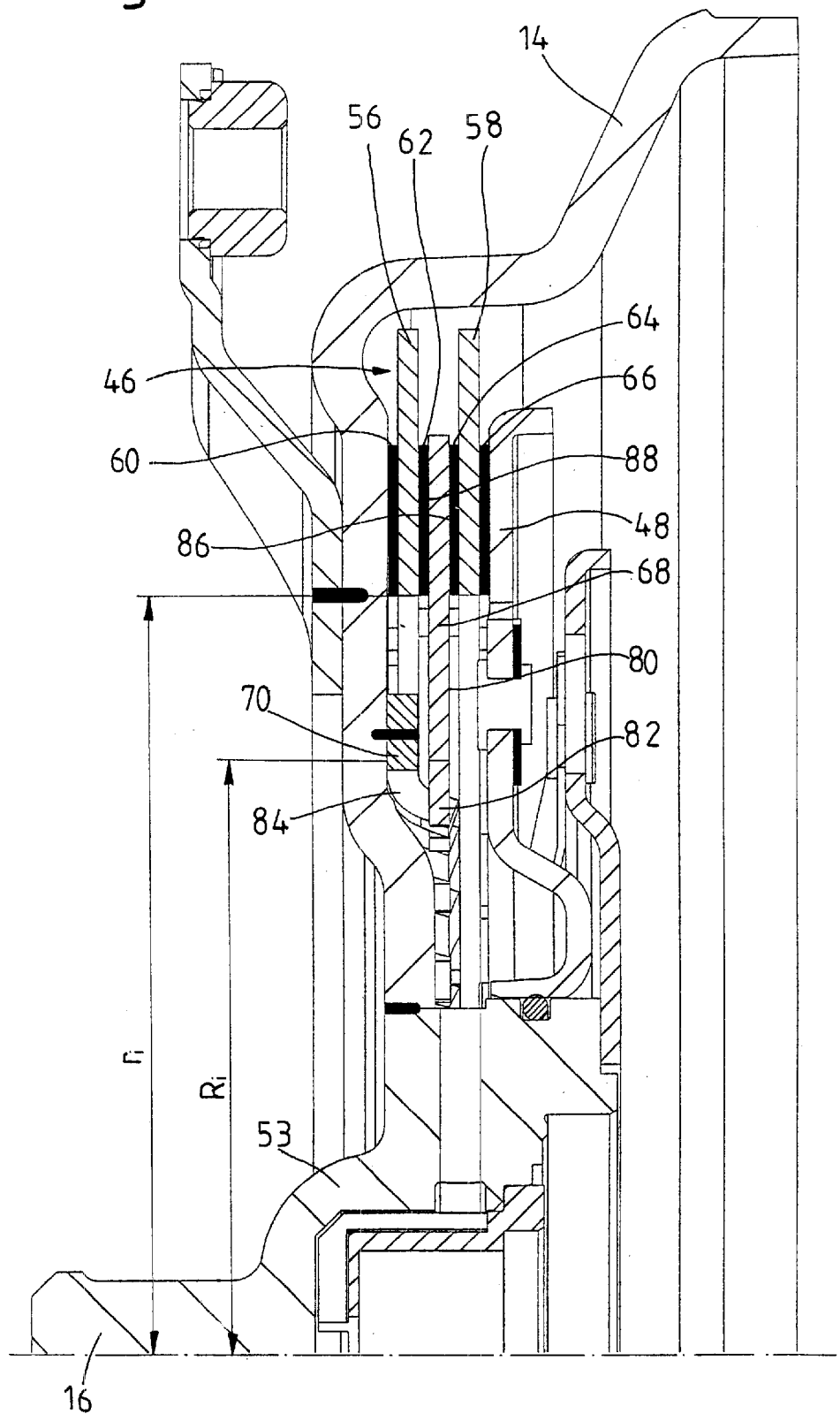
FIG. 2 shows a partial longitudinal section through a hydrodynamic clutch arrangement which is constructed according to the principles of the present invention.

FIG. 2 shows a part of a hydrodynamic clutch arrangement or a hydrodynamic torque converter which is constructed according to a first construction principle of the present invention. It will be seen in this case that the counter-friction disk 68 has a comparatively large radial extension toward the inside. The counter-friction disk has a counter-friction disk body 80 adjoined on the radial inner side by tooth-like projections 82 in a rotational driving engagement with the driver ring 70 and the teeth 84 provided at the latter. According to the principles of the present invention, the inner radius $R_i$ of the counter-friction disk body 80 is so dimensioned that it is in a ratio in the range of 0.4:1 to 0.8:1 to an inner radius $r_i$ of the friction surface regions 86, 88 which are formed or provided at the counter-friction disk 68. This means that the counter-friction disk body extends comparatively far radially inward over the inner end region of the friction surface regions 86, 88 which are actually the surface regions of the counter-friction disk 68 located across from the friction facings 60, 62, 64, 66. Therefore, a very large surface region is provided in which the counter-friction disk body 80 or counter-friction disk 68 is not acted upon by friction and in which the heat generated during friction operation can accordingly be dissipated.

Figure 3:
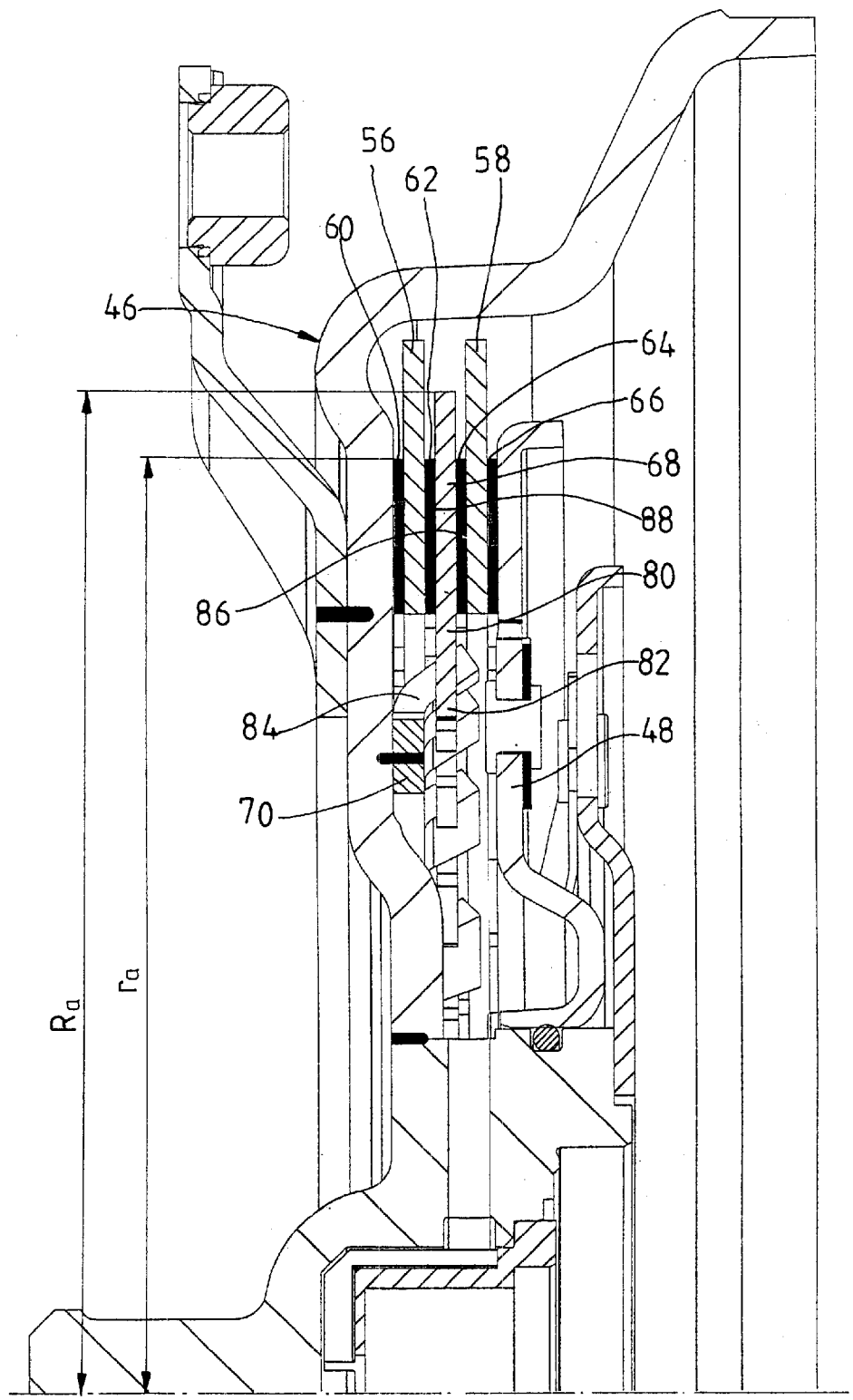
FIG. 3 shows an alternative construction type in a view corresponding to FIG. 2.

In the construction variant shown in FIG. 3, the counter-friction disk 68 is constructed in such a way that it has a longer extension radially outside of the friction surface regions 86, 88. According to the principles of the present invention, it is provided in particular that the outer radius $R_a$ of the counter-friction disk 68 and of the counter-friction disk body 80 is in a ratio of 1.1:1 to 1.5:1 to an outer radius $r_a$ of the friction surface regions 86, 88 which actually corresponds to the outer radius of the friction facings 62, 64. It is also possible in this way to cool a comparatively large surface region of the counter-friction disk body by circulation of fluid around it. In particular, the counter-friction disk body 80 can, in this case, be extended radially outward until it terminates just radially inside of the driver ring 52 which is in a rotational driving engagement with the two plates 56, 58.

Figure 4:
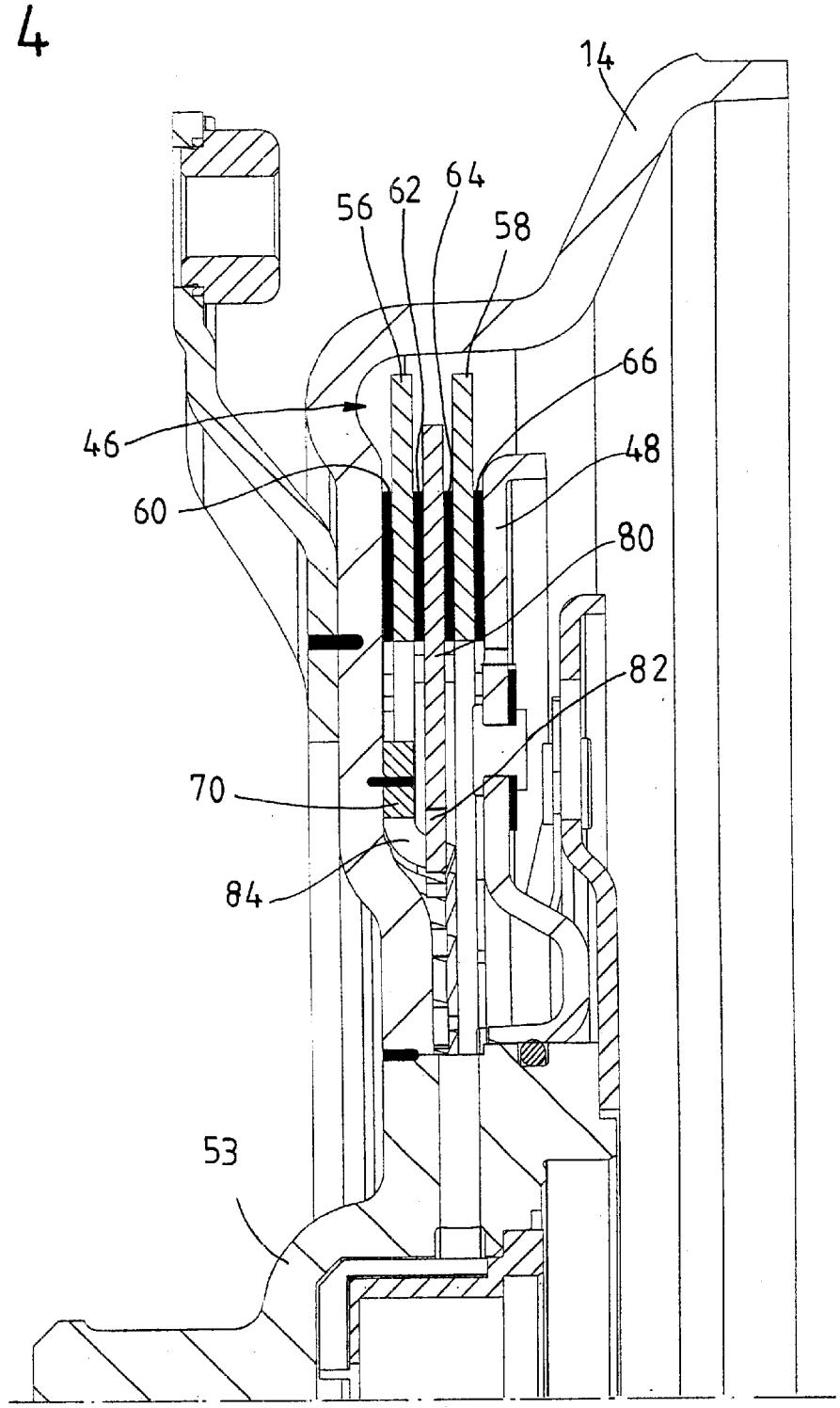
FIG. 4 shows another view corresponding to FIG. 2 of an alternative construction type.

In the construction variant shown in FIG. 4, the two principles shown in FIGS. 2 and 3 are realized together, i.e., the counter-friction disk body 80 is lengthened on the radial outer side as well as on the radial inner side, so that larger surface regions are available on the outer side as well as on the inner side for liquid cooling.

Figure 5:
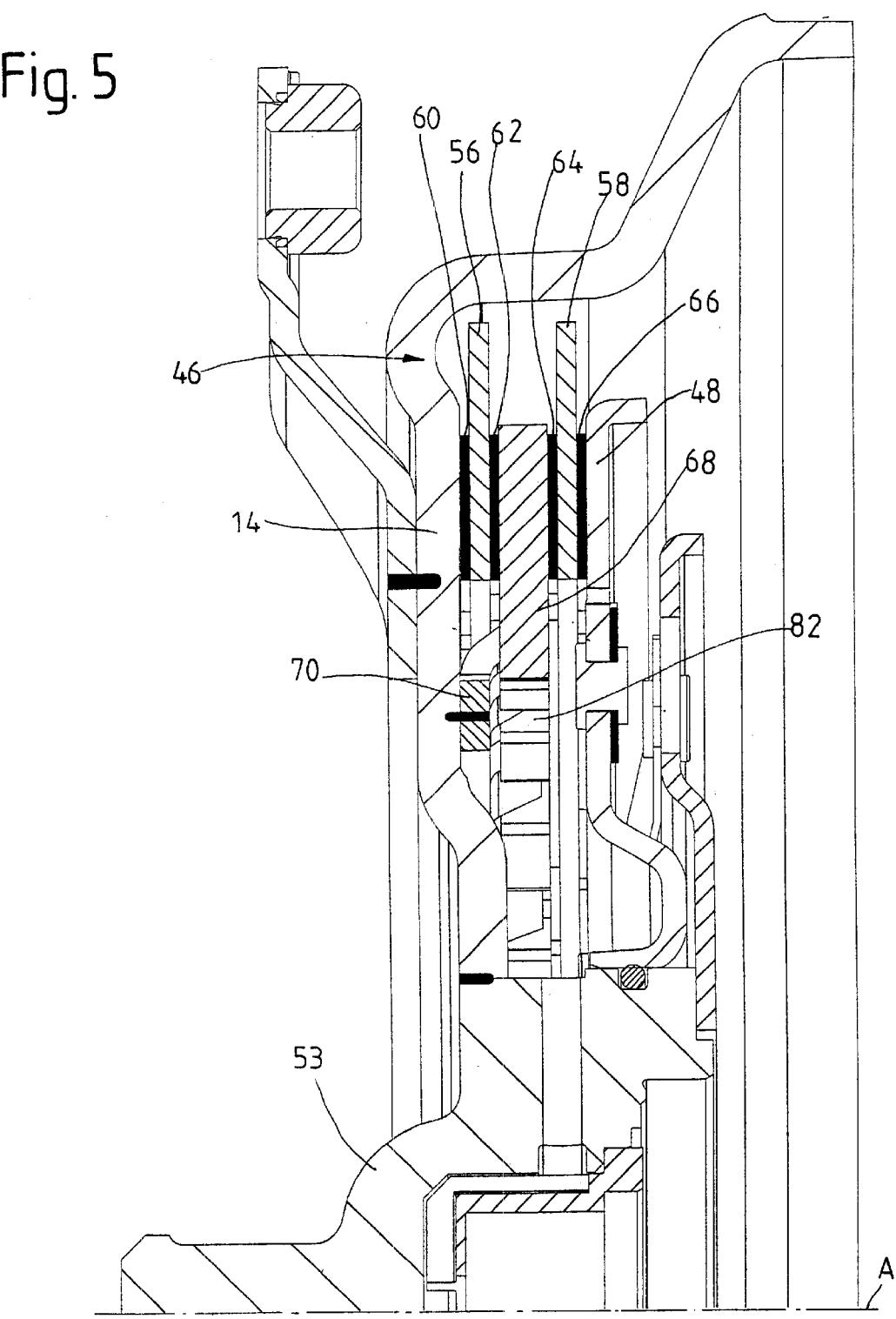
FIG. 5 shows another view corresponding to FIG. 2 of an alternative construction type.

FIG. 5 shows a construction variant in which the counter-friction member or counter-friction disk 68 is appreciably thicker than in the embodiment forms described above in direction of the axis of rotation A. It will be seen in particular that the counter-friction disk 68 has a thickness in this case which is appreciably greater than the thickness of the clutch piston 48 in the region in which there is frictional interaction between it and the friction facing 66 of the plate 58. Also, the material thickness of the counter-friction disk 68 is appreciably greater than the corresponding material thickness of the housing cover 14 in its region in which there is frictional interaction between it and the friction facing 60 of the plate 56. In this way, it is ensured that the friction heat generated in the counter-friction member or counter-friction disk 68 when the plates 56, 58 and the counter-friction disk 68 are acted upon by the clutch piston 48 can be distributed substantially better and can also be carried off outwardly to the liquid circulating around the counter-friction disk 68 over a larger volume area and a larger surface region.

Of course, the principles of the invention described above with regard to increasing the radial extension of the counter-friction member and the thickness thereof can also be combined. Further, it is noted that, of course, the principle of the invention can also be applied when more than two plates and, therefore, also more than one counter-friction disk, is provided, i.e., there is a greater axial staggering or graduation of frictionally interacting members with respect to quantity. In every case, in those members at which friction surface regions are formed directly at their, e.g., metallic, surface and not in the area of friction facings, the steps according to the invention result in an improved dissipation of the generated friction heat and material stress can accordingly be reduced. Further, it is noted that, of course, the principles of the present invention can also be applied when, for example, the clutch piston is connected, together with the counter-friction member, for common rotation with the turbine wheel and the two or more plates are coupled with the housing arrangement for common rotation. Finally, the advantages of the principles of the invention can always be used in a particularly advantageous manner whenever a counter-friction member having no friction facings is acted upon by friction, for example, by friction members which are arranged on both sides of the latter and which can then, but need not, carry friction facings, as the case may be.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. A hydrodynamic clutch arrangement comprising a housing arrangement, a turbine wheel in said housing arrangement, and a lock-up clutch arrangement for selectively producing a torque transmitting connection between the turbine wheel and the housing arrangement, said lock-up clutch arrangement comprising two friction members which are rotationally fixed with respect to one of said housing arrangement and said turbine wheel, said friction members having friction surface regions, said friction surface regions having an outer radius $r_a$ and an inner radius $r_i$, a counter-friction member which is interposed between said friction members and is rotationally fixed with respect to the other of said housing arrangement and said turbine wheel, said counter-friction member having friction surface regions which can be brought into contact with said friction surface regions of said friction members, said counter friction member comprising an annular counter-friction member body having an outer radius $R_a$ and an inner radius $R_i$, wherein at least one of the following relationships holds: $R_a/r_a=1.1$ to 1.5, and $R_i/r_i=0.4$ to 0.8.

2. A hydrodynamic clutch arrangement as in claim 1 wherein the counter-friction body arrangement has a radial inner area provided with a toothed coupling arrangement, and the housing arrangement has a rotational coupling formation which is in rotational driving engagement with said toothed coupling formation.

3. A hydrodynamic clutch arrangement as in claim 1 wherein said at least two friction members are rotationally fixed with respect to said turbine wheel.

4. A hydrodynamic clutch arrangement as in claim 1 wherein said friction surface regions of said friction members comprise friction facings.

5. A hydrodynamic clutch arrangement as in claim 1 wherein said counter-friction member has a thickness, said arrangement further comprising:

a pressing element for bringing said friction members and said counter-friction member into mutual contact, said pressing element having a region which acts upon the friction members and the counter-friction member, said region having a thickness, and an abutment member against which said friction members and said counter-friction member are pressed by said abutment member, said abutment member having a thickness, wherein the thickness of the counter-friction member is greater than or equal to at least one of the thickness of the region of the pressing element and the thickness of the abutment member.

6. A hydrodynamic clutch arrangement as in claim 5 wherein said friction members are rotationally fixed with respect to said turbine wheel, and said counter-friction member is rotationally fixed with respect to said turbine wheel.

7. A hydrodynamic clutch arrangement as in claim 5 wherein said housing arrangement forms said abutment member.

* * * * *